(12) United States Patent
Flosbach et al.

(10) Patent No.: US 7,470,452 B1
(45) Date of Patent: Dec. 30, 2008

(54) PROCESS FOR MULTILAYER COATING OF SUBSTRATES

(75) Inventors: Carmen Flosbach, Wuppertal (DE); Klaus Wissing, Duesseldorf (DE); Thomas Fey, Mainz (DE)

(73) Assignee: E. I. du Pont de Nemours & Company, Wilmington, DE (US)

( * ) Notice: Subject to any disclaimer, the term of this patent is extended or adjusted under 35 U.S.C. 154(b) by 1344 days.

(21) Appl. No.: 10/171,206

(22) Filed: Jun. 13, 2002

(51) Int. Cl.
- B05D 1/36 (2006.01)
- B05D 7/00 (2006.01)
- C08F 2/48 (2006.01)
- C08J 7/04 (2006.01)
- C08J 7/18 (2006.01)

(52) U.S. Cl. .................... 427/407.1; 427/140; 427/402; 427/508; 427/514; 427/515

(58) Field of Classification Search ................. 427/558, 427/140, 402, 407.1, 508, 514, 515
See application file for complete search history.

(56) References Cited

U.S. PATENT DOCUMENTS

| | | | |
|---|---|---|---|
| 4,212,901 A | | 7/1980 | van Neerbos et al. |
| 4,246,368 A | * | 1/1981 | Murase ................. 525/117 |
| 5,312,943 A | * | 5/1994 | Gaglani ................. 556/414 |
| 5,985,956 A | | 11/1999 | Barsotti et al. |
| 6,333,077 B1 | * | 12/2001 | Maag et al. ............ 427/496 |
| 6,384,125 B1 | * | 5/2002 | Bergstrom et al. ...... 524/492 |
| 2003/0181590 A1 | | 9/2003 | Lettmann et al. |
| 2004/0235997 A1 | | 11/2004 | Meisenburg et al. |

FOREIGN PATENT DOCUMENTS

| | | |
|---|---|---|
| DE | 197 09 560 C1 | 5/1998 |
| EP | 0 566 801 A2 | 10/1993 |
| EP | 0630952 A1 | 12/1994 |
| EP | 0 867 469 A | 9/1998 |
| EP | 1391492 A1 | 2/2004 |
| JP | 53-11082 | 11/1993 |
| JP | 07 242798 A | 9/1995 |
| JP | 2001 125079 A | 5/2001 |
| WO | WO 94/09013 | 4/1994 |
| WO | WO 97/14737 A1 | 4/1997 |
| WO | WO 98/00456 | 1/1998 |
| WO | WO 99/67318 | 12/1999 |
| WO | WO 02/20637 | 3/2002 |
| WO | WO 02/090001 A2 | 11/2002 |
| WO | WO 02/090451 A1 | 11/2002 |
| WO | WO03/016411 A1 | 2/2003 |
| WO | WO 03/106055 A1 | 12/2003 |
| WO | WO 03/106578 A1 | 12/2003 |

OTHER PUBLICATIONS

The FA-1028 International Search report mailed Oct. 2003.
The FA-1050 International Search report mailed Oct. 2003.

* cited by examiner

Primary Examiner—Elena T Lightfoot

(57) ABSTRACT

The invention relates to a process for multi-layer coating of substrates, in particular vehicles and vehicle parts, by applying two or more coating layers and curing of the applied coatings, wherein at least one of the coating layers is produced from a coating composition which comprises at least one polyurethane binder with free-radically polymerizable olefinic double bonds in the form of (meth)acryloyl groups and with hydrolysable alkoxysilane groups, wherein the resin solids content of the coating composition exhibits an equivalent weight of C=C double bonds of 200-2000, preferably of 300-1500, and a content of silicon bound in alkoxysilane groups of 1-10 wt-%, preferably of 1-7 wt-%, especially preferably of 2-6 wt-%, and wherein curing of the coating layer, of which there is at least one, proceeds by free-radical polymerisation of the C=C double bonds on irradiation with high energy radiation and by the formation of siloxane bridges under the action of moisture.

10 Claims, No Drawings

PROCESS FOR MULTILAYER COATING OF SUBSTRATES

FIELD OF INVENTION

The invention relates to a process for multi-layer coating of substrates, in particular, vehicles and vehicle parts, wherein curing of at least one of the layers of the multi-layer structure, preferably the outer layer, is performed with high energy radiation and by means of moisture.

DESCRIPTION OF RELATED ART

Various dual cure systems are known in coatings technology that combine curing by means of high energy radiation, in particular by means of UV radiation, with moisture curing. Such systems generally comprise organopolysiloxane binders that contain both hydrolysable silane groups and free-radically polymerizable, olefinically unsaturated groups. WO 99/67318, for example, describes a binder system based on two differently functionalized polysiloxanes, wherein one polysiloxane comprises (meth)acryloyl groups and the second polysiloxane comprises ethylenically unsaturated groups and hydrolysable silane groups. This binder system is used in potting applications and in coating compositions for electronic components and electronic circuits.

JP 5311082 describes a radiation- and moisture-curing binder system which is produced by reacting a polyether comprising amino end groups or a polybutadiene/acrylonitrile copolymer with compounds which contain epoxy and alkoxysilane groups and further reacting the resultant reaction product with compounds which contain (meth)acryloyl groups and, for example, NCO groups. One-layer coatings are obtained which are tack-free after 24 hours and exhibit good tear strength and elongation.

WO 94/09013 discloses a UV-curable coating system with good electrical properties for electronic circuits, which system additionally cures by means of moisture. A urea oligomer with acryloyl groups and alkoxysilane groups is used, which oligomer is produced, for example, from a urea derivative, in particular the reaction product of a diisocyanate and an amine containing alkoxysilane groups and a (meth)acryloyl-functional diol.

It is also known to use coating compositions curable by means of UV radiation in vehicle coating. Coating compositions based on free-radically polymerizable binders are in particular used in such applications. One shortcoming of these UV-curable coatings is, inter alia, that, when three-dimensional objects are to be coated, only inadequate curing is observed in shaded areas, i.e., in areas that are not reached or only inadequately reached by the UV radiation. One remedy to this problem that has been attempted is to use "dual cure" systems, i.e., binder systems, which cure both by free-radical polymerization with UV-irradiation and by another cross-linking mechanism, for example, by means of an OH/NCO reaction. Examples of such dual cure systems are described in WO-A-98/00456 and DE-A-197 09 560. Binder systems which cure not only by UV curing but additionally by an OH/NCO reaction are two-component systems, which must be prepared in two components and can be mixed together only shortly before application.

Nothing is known from the prior art concerning the use of coating compositions that are curable both by means of UV radiation and by means of moisture for the multi-layer coating of vehicles and parts thereof.

There is a requirement when coating vehicles and vehicle parts in multi-layer coating processes using coating compositions curable by means of UV radiation, in particular, coating compositions for producing the outer layer of a multi-layer coating, that coatings are obtained which have elevated hardness and scratch resistance and good chemical resistance. This is accomplished by achieving elevated cross-linking levels in the coating even in shaded areas not reached by the UV radiation. In particular, adequate hardness, scratch resistance and good chemical resistance should also be achieved even at low curing temperatures of, for example, no more than 80° C., in relatively short curing times.

SUMMARY OF THE INVENTION

The invention relates to a process for multi-layer coating of substrates, in particular vehicles and vehicle parts, by applying two or more coating layers and curing of the applied coatings, wherein at least one of the coating layers is produced from a coating composition which comprises at least one polyurethane binder with free-radically polymerizable olefinic double bonds in the form of (meth)acryloyl groups and with hydrolysable alkoxysilane groups, wherein the resin solids content of the coating composition exhibits an equivalent weight of C=C double bonds of 200-2000, preferably of 300-1500, and a content of silicon bound in alkoxysilane groups of 1-10 wt-%, preferably of 1-7 wt-%, especially preferably of 2-6 wt-%, and wherein curing of the coating layer, of which there is at least one, proceeds by free-radical polymerization of the C=C double bonds on irradiation with high energy radiation and by the formation of siloxane bridges under the action of moisture.

Both here and below, (meth)acryloyl and (meth)acrylic are respectively intended to mean acryloyl and/or methacryloyl and acrylic and/or methacrylic.

The invention preferably relates to a process for multi-layer coating of substrates, in particular vehicles and vehicle parts, by applying two or more coating layers and curing of the applied coatings, wherein the outer layer of the multi-layer structure is prepared from a coating composition which comprises at least one polyurethane binder with free-radically polymerizable olefinic double bonds in the form of (meth)acryloyl groups and with hydrolysable alkoxysilane groups, wherein the resin solids content of the coating composition exhibits an equivalent weight of C=C double bonds of 200-2000, preferably of 300-1500, and a content of silicon bound in alkoxysilane groups of 1-10 wt-%, preferably of 1-7 wt-%, especially preferably of 2-6 wt-%, and wherein curing of the coating layer, of which there is at least one, proceeds by free-radical polymerization on irradiation with high energy radiation and by the formation of siloxane bridges under the action of moisture.

DETAILED DESCRIPTION OF THE EMBODIMENTS

The resin solids content of the coating compositions curable by means of high energy radiation and by means of moisture includes the polyurethane binder, of which there is at least one, with free-radically polymerizable olefinic double bonds in the form of (meth)acryloyl groups and with hydrolysable alkoxysilane groups, together with any optionally present further binders and optionally present reactive diluents. Optionally, additional binders and reactive diluents may be present in an amount of not more than 50 wt-%, preferably, not more than 30 wt-%, based on the resin solids content of the coating composition.

The outer layer of the multi-layer structure may comprise a clear coat layer applied onto a color-imparting and/or special effect-imparting base coat layer or a pigmented one-layer top coat layer applied onto a prior coating. It may also comprise a transparent sealing layer which is applied, for example, onto the outer coating layer of a multi-layer coating, in particular onto a clear coat layer or a pigmented one-layer top coat layer, in order to achieve particular scratch resistance. It is, however, also possible for any other desired layers of the multi-layer structure to be produced according to the invention from the coating compositions described above and to be cured correspondingly.

It has surprisingly been found that it is possible by means of the process according to the invention to produce clear coat layers or one-layer top coat layers and sealing layers which, in addition to adequate hardness, also exhibit elevated cross-linking and chemical resistance in shaded areas, wherein these properties can be achieved even at low curing temperatures of for example no more than 80° C., in relatively short curing times.

The coating compositions curable by means of high energy radiation and by means of moisture used in the process according to the invention contain at least one polyurethane binder with free-radically polymerizable olefinic double bonds in the form of (meth)acryloyl groups and with hydrolysable alkoxysilane groups. The coating compositions used in the process according to the invention cure by means of two different cross-linking mechanisms. Cross-linking proceeds, on the one hand, by means of free-radical polymerization of olefinic double bonds and, on the other, by means of the hydrolysis and subsequent condensation of alkoxysilane groups to form siloxane bridges.

The polyurethane binders are polyurethane prepolymers, such as polymers and oligomers, containing, per molecule, one or more, for example on average 1 to 20, preferably 2-10, particularly preferably 2-6 free-radically polymerizable olefinic double bonds in the form of (meth)acryloyl groups. The (meth)acryloyl-functional polyurethane prepolymers have a number average molar mass Mn of for example 500 to 10000 g/mol, preferably of 500 to 5000 g/mol. The resins solids content of the (meth)acryloyl-functional polyurethane prepolymers has an equivalent weight of C=C double bonds of 200-2,000, preferably of 300-1,500 and a content of silicon bound in alkoxysilane groups of 1-10 wt-%, preferably, of 1-7 wt-%, especially, preferably, of 2-6 wt-%.

The polyurethane (meth)acrylates additionally contain hydrolysable alkoxysilane groups. The alkoxysilane groups may comprise monoalkoxysilane, dialkoxysilane and/or trialkoxysilane groups. Trialkoxysilane groups are preferred. The alkoxysilane groups comprise, for example, 1-10, preferably 1-3 C atoms in the alkoxy residue.

The polyurethane binders with free-radically polymerizable olefinic double bonds in the form of (meth)acryloyl groups and with hydrolysable alkoxysilane groups may be produced by various methods. According to a first variant, (meth)acryloyl-functional polyurethanes are first produced, into which alkoxysilane groups are subsequently introduced. According to a second variant, polyurethanes containing alkoxysilane groups are first produced and (meth)acryloyl groups are then introduced into these polyurethanes. Both production variants will be described in greater detail below.

According to variant 1, (meth)acryloyl-functional polyurethanes are first produced using conventional methods. This may, for example, proceed by: transesterifying OH-functional polyurethanes with alkyl esters of (meth)acrylic acid; esterifying OH-functional polyurethane resins with (meth)acrylic acid; reacting OH-functional polyurethane resins with isocyanate-functional (meth)acrylates or reacting acid-functional polyurethanes with epoxy-functional (meth)acrylates. The hydrolysable alkoxysilane groups are then introduced.

Functionalization of the polyurethane (meth)acrylates with hydrolysable alkoxysilane groups may, for example, proceed by reacting residual OH groups in the polyurethane (meth)acrylate with isocyanate-functional alkoxysilanes or reacting residual epoxy groups with aminoalkoxysilanes or reacting some of the acryloyl groups with aminoalkoxysilanes.

For example, polyisocyanates may be reacted with hydroxyalkyl (meth)acrylates, the isocyanate groups being completely consumed, and the aminoalkoxysilanes may then be added to some of the double bonds by Michael addition. Some of the isocyanate groups of a polyisocyanate may also be reacted with hydroxyalkyl (meth)acrylates and the aminoalkoxysilane may then be added to the residual isocyanate groups.

According to variant 2, compounds comprising alkoxysilane groups are first produced and (meth)acryloyl groups are then introduced. This may, for example, proceed by reacting an alkyl (meth)acrylate with a primary aminoalkoxysilane by Michael addition to yield the secondary aminoalkoxysilane and then performing a reaction with polyisocyanates to yield an NCO-functional prepolymer. The prepolymer containing NCO may then be reacted with hydroxyalkyl (meth)acrylates. Similarly, it is also possible in the first step to react a primary aminoalkoxysilane with a cyclic carbonate to yield the OH-functional alkoxysilane, which latter is then further reacted with polyisocyanate and hydroxyalkyl (meth)acrylates. It is also possible initially to react polyisocyanates with secondary aminoalkoxysilanes and then further to react residual isocyanate groups with hydroxyalkyl (meth)acrylates.

Variant 2 for the production of the polyurethane binder is preferably used. The equivalent ratio of free-radically polymerizable olefinic double bonds in the form of (meth)acryloyl groups to hydrolysable alkoxysilane groups (mono-, di- and trialkoxysilane groups are in each case calculated as one equivalent) in the binder system may be, for example, 1:0.1 to 1:5, preferably 1:0.2 to 1:4.

The polyurethane binders with free-radically polymerizable olefinic double bonds in the form of (meth)acryloyl groups and hydrolysable alkoxysilane groups may also additionally contain hydroxyl groups. The hydroxyl groups may be obtained or introduced using measures known to the person skilled in the art. For example, the hydroxyl groups may be introduced by reacting NCO groups still present in the binders with polyols. The polyurethane binders may, for example, exhibit hydroxyl values of 0-200 mg of KOH/g. The additionally present hydroxyl groups have a catalytic action on moisture curing and can also react with the alkoxysilane groups under condensation reaction.

The (meth)acryloyl-functional polyurethane prepolymers may be used in combination with reactive diluents, i.e., free-radically polymerizable low molecular weight compounds with a molar mass of below 500 g/mol. The reactive diluents may be mono-, di- or polyunsaturated. Examples of monounsaturated reactive diluents are (meth)acrylic acid and the esters thereof, maleic acid and the semi-esters thereof, vinyl acetate, vinyl ether, substituted vinyl ureas, styrene, vinyltoluene. Examples of diunsaturated reactive diluents are di(meth)acrylates, such as, alkylene glycol di(meth)acrylate, polyethylene glycol di(meth)acrylate, 1,3-butanediol di(meth)acrylate, vinyl (meth)acrylate, allyl (meth)acrylate, divinylbenzene, dipropylene glycol di(meth)acrylate, hexanediol di(meth)acrylate. Examples of polyunsaturated reactive diluents are glycerol tri(meth)acrylate, trimethylolpropane tri(meth)acrylate, pentaerythritol tri(meth)acrylate, pentaerythritol tetra(meth)acrylate. The reactive diluents may be used alone or in mixture.

The (meth)acryloyl-functional polyurethane prepolymers may optionally be used in combination with binders which contain (meth)acryloyl groups and no alkoxysilane groups and/or with binders which contain alkoxysilane groups and no (meth)acryloyl groups.

Free-radical inhibitors may be added to the binders in order to prevent premature polymerisation of the double bonds present. Examples of free-radical inhibitors are hydroquinone, 4-methoxyphenol, 2,6-di-tert.-butyl-4-methylphenol, phenothiazine, 3,5-di-tert.-butyl-4-hydroxyanisole, 2-tert.-butyl-4-hydroxyanisole, 3-tert.-butyl-4-hydroxyanisole, p-benzoquinone.

The coating compositions curable by means of high energy radiation and by means of moisture which are usable in the process according to the invention are liquid coating compositions. The liquid coating compositions may contain organic solvents.

The organic solvents optionally present in the liquid coating compositions comprise conventional coating solvents.

The coating compositions may contain photoinitiators in order to initiate free-radical polymerization. Suitable photoinitiators include, for example, those which absorb in the wavelength range from 190 to 600 nm. Examples of photoinitiators for free-radically curing systems are benzoin and derivatives, acetophenone and derivatives, such as, for example, 2,2-diacetoxyacetophenone, benzophenone and derivatives, thioxanthone and derivatives, anthraquinone, 1-benzoylcyclohexanol, organophosphorus compounds, such as for example acyl phosphine oxides. The photoinitiators are used, for example, in quantities of 0.1-7 wt-%, preferably of 0.5-5 wt-%, relative to the total of free-radically polymerizable prepolymers, reactive diluents and photoinitiators. The photoinitiators may be used individually or in combination. They may also be used in combination with suitable coinitiators, for example amines, such as tertiary amines.

The coating compositions may contain catalysts to catalyze moisture curing. Examples of such catalysts are Lewis bases, for example, cycloaliphatic amines, such as, diazabicyclooctane, diazabicycloundecene, diazabicyclononene; aliphatic amines, such as, triethylamine, tripropylamine, diethanolamine, monoethanolamine, triethanolamine, diethylethanolamine, dimethylethanolamine, dipropylethanolamine, dimethylisopropanolamine. Further examples of catalysts are organo tin compounds, such as, dibutyltin dilaurate, dibutyltin dioctoate and acid catalysts, such as, for example, formic acid, p-toluenesulfonic acid, dodecylbenzenesulfonic acid, dinonylnaphthalenedi- or -monosulfonic acid. The catalysts may be blocked, for example, blocked p-toluenesulfonic acid, dodecylbenzenesulfonic acid, dinonylnaphthalenedisulfonic acid or dinonylnaphthalenemonosulfonic acid. The catalysts may be used individually or in combination with one another.

The coating compositions curable by means of high energy radiation and by means of moisture which are usable in the process according to the invention may comprise pigmented or un-pigmented coating compositions for producing any desired layer of a multi-layer structure. Preferably, however, they comprise, as already described above, transparent clear coats, transparent sealing coats or pigmented one-layer top coats.

The coating compositions curable by means of high energy radiation and by means of moisture used in the process according to the invention may contain transparent as well as color-imparting and/or special effect-imparting pigments and extenders. Suitable color-imparting pigments are any conventional coating pigments of an organic or inorganic nature. Examples of inorganic or organic color-imparting pigments are titanium dioxide, micronised titanium dioxide, iron oxide pigments, carbon black, azo pigments, phthalocyanine pigments, quinacridone or pyrrolopyrrole pigments. Examples of special effect-imparting pigments are metal pigments, for example, made from aluminum, copper or other metals; interference pigments, such as for example metal oxide coated metal pigments, for example titanium dioxide coated or mixed oxide coated aluminum, coated mica, such as, for example, titanium dioxide coated mica and graphite effect pigments. Soluble dyes may also be present. Examples of usable extenders are silicon dioxide, aluminum silicate, barium sulfate, calcium carbonate and talcum.

In addition to the already stated initiators, inhibitors and catalysts, the coating composition may contain further conventional coating additives. Examples of further conventional coating additives are levelling agents, rheological agents such as highly dispersed silica or polymeric urea compounds, thickeners, for example based on partially cross-linked, carboxy-functional polymers or on polyurethanes, defoamers, wetting agents, anticratering agents, degassing agents, thermolabile initiators, antioxidants and light stabilizers based on HALS (hindered amine light stabilizer) products and/or UV absorbers. The additives are used in conventional amounts known to the person skilled in the art.

The coating compositions may be formulated as single-component or two-component coating compositions, depending upon whether a blocked or unblocked catalyst is used for moisture curing. If an unblocked catalyst is used, the binders curable by means of high energy radiation and by means of moisture, i.e., at least the binders with the hydrolysable alkoxysilane groups, are present in one component and the unblocked catalyst is present in a second component. If a blocked catalyst is used, the coating compositions may be provided as a single-component formulation without any need to prepare a second component.

According to a first preferred embodiment, the coating composition based on a binder system curable by means of high energy radiation and by means of moisture which is used in the process according to the invention is a clear coating composition which is applied onto a pigmented base coat layer to produce a clear coat layer.

According to a second preferred embodiment, the coating composition based on a binder system curable by means of high energy radiation and by means of moisture which is used in the process according to the invention is a one-layer top coat composition which is applied onto a substrate coated with one or more coating layers, for example with a primer and/or surface layer, to produce a pigmented top coat layer.

According to a third preferred embodiment, the coating composition based on a binder system curable by means of high energy radiation and by means of moisture is used in the process according to the invention to produce an outer transparent sealing layer.

In the process according to the invention, the coating compositions may be applied using known methods, preferably by spraying.

Substrates that may be used are the various materials used in vehicle construction, for example, metals, such as, iron, zinc, aluminum, magnesium, stainless steel or the alloys thereof or plastics, such as, polyurethanes, polycarbonates or polyolefins.

When applying the coating compositions based on a binder system curable by means of high energy radiation and by means of moisture, it is for example possible to proceed in such a manner that the corresponding coating composition is initially applied onto the particular substrate, wherein application may be followed by flashing-off, for example within a period of 5 to 40 minutes, at for example 20 to 60° C. After the optional intermediate flash-off phase, irradiation with high energy radiation can proceed. UV radiation or electron beam radiation may be used as high energy radiation. UV radiation is preferred. Irradiation may proceed continuously or discontinuously (in cycles).

Irradiation may be carried out, for example, in a belt unit fitted with one or more UV radiation emitters or with one or more UV radiation emitters positioned in front of the object to be irradiated, or the area to be irradiated, or the substrate to the coated and/or the UV radiation emitter(s) is(are) moved relative to one another during irradiation. For example, the subject to be coated may be moved through an irradiation tunnel fitted with one or more UV radiation emitters, and/or a robot equipped with one or more UV radiation emitters may guide the UV radiation emitter(s) over the substrate surface.

In principle, the duration of irradiation, distance from the object and/or radiation output of the UV radiation emitter may be varied during UV irradiation. The preferred source of radiation comprises UV radiation sources emitting in the wave length range from 180 to 420 nm, in particular, from 200 to 400 nm. Examples of such UV radiation sources are optionally doped high, medium and low pressure mercury vapour emitters and gas discharge tubes, such as, for example, low pressure xenon lamps. Apart from these continuously operating UV radiation sources, however, it is also possible to use discontinuous UV radiation sources. These are preferably so-called high-energy flash devices (UV flash lamps for short). The UV flash lamps may contain a plurality of flash tubes, for example, quartz tubes filled with inert gas, such as, xenon. The UV flash lamps have an illuminance of, for example, at least 10 megalux, preferably from 10 to 80 megalux per flash discharge. The energy per flash discharge may be, for example, 1 to 10 kJoule.

The irradiation time with UV radiation when UV flash lamps are used as the UV radiation source may be, for example, in the range from 1 millisecond to 400 seconds, preferably from 4 to 160 seconds, depending on the number of flash discharges selected. The flashes may be triggered, for example, about every 4 seconds. Curing may take place, for example, by means of 1 to 40 successive flash discharges.

If continuous UV radiation sources are used, the irradiation time may be, for example, in the range from a few seconds to about 5 minutes, preferably less than 5 minutes.

The distance between the UV radiation sources and the substrate surface to be irradiated may be, for example, 5 to 60 cm.

Irradiation with UV radiation may proceed in one or more successive irradiation steps. In other words, the energy to be applied by irradiation may be supplied completely in a single irradiation step or in portions in two or more irradiation steps.

Curing under the action of moisture is carried out by exposure to conditions of sufficient moisture, e.g., by exposure to humidity.

In order to promote rapid development of satisfactory hardness, scratch resistance and chemical resistance in the shaded areas too, it is advantageous to expose the applied coating layer to thermal energy before, during and/or after UV irradiation. The coating layer may, for example, be exposed to temperatures of approx. 60° C. to 160° C., preferably of 80° C. to 120° C. (object temperature in each case). It is, however, particularly advantageous in order to achieve good resistance values and adequate tack-free drying and hardness also in the shaded zones for it to be possible for curing to proceed even at temperatures of no more than 80° C. in short curing times of for example 10-30 minutes.

The process according to the invention may be used in industrial and vehicle coating, in particular in vehicle original coating and in vehicle repair coating.

The following Examples are intended to illustrate the invention in greater detail. The following abbreviations are used in the Examples: pbw means parts by weight, while wt-% means weight percent.

EXAMPLES

Example 1

Production of Alkoxysilane-Functional Urethane Acrylates A 478 pbw of hexamethylene diisocyanate biuret (75%, Tolonate® HDB/75 from Rhodia), 8 pbw of neopentyl glycol and 30 pbw of butyl acetate were initially introduced into a 2 liter, four-necked flask fitted with a stirrer, thermometer and column. The reaction mixture was heated to a maximum of 60° C. 235 pbw of a secondary aminoalkoxysilane (Silquest® A 1170, Witco) were then apportioned in such a manner that the temperature did not exceed 80° C. Rinsing was performed with 40 pbw of butyl acetate. Once an NCO value of <5.9 had been reached, 0.6 pbw of methylhydroquinone and 0.5 pbw of dibutyltin dilaurate solution (10%) were added. 149 pbw of butanediol monoacrylate were then apportioned in such a manner that the temperature did not exceed 80° C. The reaction mixture was stirred at a maximum of 80° C. until an NCO value was no longer detectable. The mixture was then diluted with 60 pbw of butyl acetate.

A colorless resin solution was obtained with a solids content of 72.3% (1 h/150° C.), a viscosity of 1840 mPas (Höppler, 25° C.), a calculated double bond equivalent weight of 729 and a calculated content of silicon bound in alkoxysilane groups of 5.6 wt-%, relative to resin solids content.

Example 2

Production of Alkoxysilane-Functional Urethane Acrylates B 529 pbw of hexamethylene diisocyanate biuret (75%, Tolonate® HDB/75 from Rhodia), 9 pbw of neopentyl glycol and 20 pbw of butyl acetate were initially introduced into a 2 liter, four-necked flask fitted with a stirrer, thermometer and column. The reaction mixture was heated to a maximum of 60° C. 179 pbw of a primary aminoalkoxysilane (Dynasilan 1189, Degussa) were then apportioned in such a manner that the temperature did not exceed 80° C. Rinsing was performed with 40 pbw of butyl acetate. Once the NCO value had been reached, 0.6 pbw of methylhydroquinone and 0.5 pbw of dibutyltin dilaurate solution (10%) were added. 165 pbw of butanediol monoacrylate were then apportioned in such a manner that the temperature did not exceed 80° C. The reaction mixture was stirred at a maximum of 80° C. until an NCO value was no longer detectable. The mixture was then diluted with 57 pbw of butyl acetate.

A colorless resin solution was obtained with a solids content of 73.2% (1 h/150° C.), a viscosity of 2660 mPas (Höppler, 25° C.), a calculated double bond equivalent weight of 658 and a calculated content of silicon bound in alkoxysilane groups of 3.5 wt-%, relative to resin solids content.

Example 3

Production of Alkoxysilane-Functional Urethane Acrylates C 121 pbw of a primary aminoalkoxysilane (Dynasilan AMMO, Degussa) were reacted with 86 pbw of butyl acrylate in 35 pbw of butyl acetate in a 2 liter, four-necked flask fitted with a stirrer, thermometer and column. Once the exothermic reaction had subsided, 515 pbw of hexamethylene diisocyanate biuret (75%, Tolonate® HDB/75 from Rhodia) and 3.5 pbw of butyl acetate were added. At a maximum temperature of 80° C., the reaction was continued until an NCO value of 7.15% was reached. The reaction mixture was then combined with 0.6 pbw of methylhydroquinone and 0.5 pbw of dibutyltin dilaurate (as 10% solution). 156 pbw of hydroxyethyl acrylate were then apportioned in such a manner that the temperature did not exceed 80° C. The reaction mixture was stirred at a maximum of 80° C. until an NCO value was no longer detectable. The mixture was then diluted with 51 pbw of butyl acetate.

A colorless resin solution was obtained with a solids content of 70.0% (1 h/150° C.), a viscosity of 1065 mPas (Höppler, 25° C.), a calculated double bond equivalent weight of 556 and a calculated content of silicon bound in alkoxysilane groups of 3.6 wt-%, relative to resin solids content.

Example 4

Production of Clear Coats

Clear coats 1-3 usable in the process according to the invention were formulated from the following constituents:

Clear Coat 1 (Single-Component):

70.0 wt-% of urethane acrylate resin A from Example 1

0.6 wt-% of Tinuvin® 400/85 (UV absorber; CIBA)

0.5 wt-% of Tinuvin® 292 (HALS; CIBA)

0.3 wt-% of Byk 341/52 (levelling agent; Byk)

0.9 wt-% of Darocur® 1173 (photoinitiator; CIBA)

0.3 wt-% of Irgacure® 819 (photoinitiator; CIBA)

2.0 wt-% of Nacure® 2500 (p-toluenesulfonic acid based catalyst, blocked; King Industries)

25.4 wt-% of Solvesso® 100 (mixture of aromatic hydrocarbons)

Clear Coat 2 (Single-Component):

70.0 wt-% of urethane acrylate resin B from Example 2

0.6 wt-% of Tinuvin® 400/85 (UV absorber; CIBA)

0.5 wt-% of Tinuvin® 292 (HALS; CIBA)

0.2 wt-% of Tego Rad 2100 (levelling agent; Tego Chemie Service GmbH)

0.9 wt-% of Darocur® 1173 (photoinitiator; CIBA)

0.3 wt-% of Irgacure® 819 (photoinitiator; CIBA)

0.5 wt-% of DBTL (dibutyltin dilaurate; catalyst)

27.0 wt-% of Solvesso® 100 (mixture of aromatic hydrocarbons)

Clear Coat 3 (Two-Component)

Component 1:

70.0 wt-% of urethane acrylate resin C from Example 3

0.5 wt-% Sanduvor® 3058 (HALS; CIBA)

0.5 wt-% of Sanduvor® 3206 (UV absorber; CIBA)

0.3 wt-% of Tego Rad 2100 (levelling agent; Tego Chemie Service GmbH)

0.9 wt-% of Darocur® 1173 (photoinitiator; CIBA)

0.3 wt-% of Irgacure®819 (photoinitiator; CIBA)

27.6 wt-% of Solvesso® 100 (mixture of aromatic hydrocarbons)

Component 2 (Catalyst):

90.0 wt-% of xylene 10.0 wt-% of p-toluenesulfonic acid 100 pbw of component 1 were mixed shortly before application with 5 pbw of component 2.

Clear coats 1-3 produced above were adjusted to spraying viscosity (24 seconds, flow cup 4) with Solvesso® 100.

Application and Curing of Clear Coats 1-3

The clear coats 1-3 produced above were applied to a dry film thickness of approx. 35 μm onto steel sheets coated with conventional commercial electro-dipcoating, surfacer and base coat (flashed off). After flashing off for 10 minutes at room temperature and drying within 20 minutes at 80° C. (circulating air oven), each of the coatings was irradiated with a conventional commercial UV-radiation emitter (medium pressure mercury emitter from Fusion, 240 W/cm, 100% output, at a UV-emitter/object distance of 5.5 cm and a belt speed of 3 m/min).

In order to simulate curing in the shaded areas of an appropriately shaped three-dimensional substrate, i.e., in the areas of a substrate which are not reached by the UV radiation emitters, metal test sheets were produced in a manner similar to that described above and coatings 1-3 were then cured only with moisture/thermal energy. After application, the coatings were in each case left for 10 minutes at room temperature (flash-off phase) and then cured for 20 minutes at 80° C. (circulating air oven).

The following table shows the technical properties of the resultant coatings.

| | Coating 1 thermal only | Coating 1 thermal + UV | Coating 2 thermal only | Coating 2 Thermal + UV | Coating 3 thermal only | Coating 3 thermal + UV |
|---|---|---|---|---|---|---|
| Indentation (mm) | 7.5 | 6.5 | 8.0 | 7.0 | 7.5 | 6.5 |
| Scratch resistance (Amtec) | 50 | 85 | 45 | 80 | 50 | 83 |
| Xylene test | OK | OK | OK | OK | OK | OK |
| Acid test | 12 | 25 | 11 | 23 | 10 | 22 |
| Constant climate test | 0/0 | 0/0 | 0/0 | 0/0 | 0/0 | 0/0 |

Test Methods:

Indentation to DIN EN ISO 1520, Value in Millimeters

Amtec scratch resistance, stated as residual gloss after reflow in % Residual gloss was measured in % (ratio of initial gloss of the clear coat surface to its gloss after wash scratching, gloss measurement in each case being performed at an angle of illumination of 200). Wash-scratching was performed using an Amtec Kistler laboratory car wash system (c.f. Th. Klimmasch and Th. Engbert, Entwicklung einer einheitlichen Laborprufinethode für die Beurteilung der Waschstraßenbeständigkeit von Automobil-Decklacken [development of a standard laboratory test method for evaluating resistance of automotive top coats to car wash systems], in DFO proceedings 32, pages 59 to 66, technology seminars, proceedings of the seminar on 29-30.4.97 in Cologne, published by Deutsche Forschungsgesellschaft für Oberflächenbehandlung e.V., Adersstraße 94, 40215 Düsseldorf).

Xylene Test:

Brief description: A xylene-soaked filter paper is placed on the coating film for 10 minutes. Evaluation: OK=no visible change Acid Test:

Brief description: at 65° C., 50 µl drops of 36% sulfuric acid are placed at 1 minute intervals for 30 minutes onto the coating film.

Evaluation: Destruction of the film after X minutes (0-30)

Constant Climate Test:

to DIN 50017, evaluation: degree of blistering m/g to DIN 53209

According to the invention, coatings were obtained which were tack-free in the shaded areas too (moisture curing only, thermally supported) and exhibited adequate hardness and elevated cross-linking, wherein the latter was in particular demonstrated by the xylene test.

What is claimed is:

1. A process for multi-layer coating of vehicles and vehicle parts which comprises the steps of applying at least two coating layers and curing of the applied coating layers with high energy radiation and moisture;

wherein at least one coating layer is formed from a coating composition comprising a resin solids content of at least one polyurethane binder with free-radically polymerizable olefinic double bonds in the form of (meth)acryloyl groups and with hydrolysable alkoxysilane groups and hydroxyl groups, wherein the resin solids content of the coating composition has an equivalent weight of C=C double bonds of 200-2000 and a silicon content of 1-10 wt-%, wherein the silicon is bound in alkoxysilane groups and wherein the step of curing the at least one coating layer comprises irradiation with high energy radiation thereby polymerizing the C=C double bonds via free radical polymerization and exposure to moisture thereby forming siloxane bridges from the alkoxysilane groups.

2. The process according to claim 1, wherein the polyurethane binder is formed by first forming a polyurethane compound with hydrolysable alkoxysilane groups and then introducing (meth)acryloyl groups into said polyurethane compound.

3. The process according to claim 1, wherein the coating composition with at least one polyurethane binder having free-radically polymerizable olefinic double bonds in the form of (meth)acryloyl groups and with hydrolysable alkoxysilane groups and hydroxyl groups is a clear coating composition which is applied onto a pigmented base coat layer to produce a clear coat layer.

4. The process according to claim 1, wherein the coating composition with at least one polyurethane binder having free-radically polymerizable olefinic double bonds in the form of (meth)acryloyl groups and with hydrolysable alkoxysilane groups and hydroxyl groups and being pigmented is applied as a one-layer top coat composition onto a substrate selected from the group consisting of a primer layer, a surfacer layer and a primer/surfacer layer and cured to form a pigmented one-layer top coat.

5. The process according to claim 1, wherein the coating composition of the at least one polyurethane binder having free-radically polymerizable olefinic double bonds in the form of (meth)acryloyl groups and with hydrolysable alkoxysilane groups and hydroxyl groups is applied as a transparent sealing coat onto a multilayer coating to form an outer transparent sealing layer.

6. The process according to claim 1, wherein the coating composition of the at least one polyurethane binder system comprises a polyurethane having free-radically polymerizable olefinic double bonds in the form of (meth)acryloyl groups and with hydrolysable alkoxysilane groups and hydroxyl groups, and wherein the resin solids content of the coating composition has an equivalent weight of C=C double bonds of 300-1500, and a silicon content of 1-7 wt-% wherein the silicon is bound in alkoxysilane groups.

7. The process according to claim 1, wherein the alkoxysilane groups comprise trialkoxysilane groups.

8. The process according to claim 1, wherein the high energy radiation is UV radiation.

9. The process according to claim 1, which comprises a process for the original multi-layer coating of vehicles.

10. The process according to claim 1, which comprises the repair of a vehicle coating.

* * * * *